Aug. 6, 1940.   E. A. CORBIN, JR   2,210,282

LINE CHECK VALVE

Filed Jan. 5, 1939

ELBERT A. CORBIN JR
INVENTOR.

BY Louis N. Necho
ATTORNEY.

Patented Aug. 6, 1940

2,210,282

UNITED STATES PATENT OFFICE 2,210,282

LINE CHECK VALVE

Elbert A. Corbin, Jr., Lansdowne, Pa., assignor of one-half to William C. Biddle, Lansdowne, Pa.

Application January 5, 1939, Serial No. 249,404

1 Claim. (Cl. 251—127)

My invention relates to a new and useful line check valve which is adapted to be held in the closed or open position or which may be allowed to function automatically.

My invention still further relates to a line check valve construction of this character in which the valve piston is adapted for reciprocal longitudinal movement to open or close the valve throat as distinguished from hinged flap check valves whereby the rate of flow remains unaffected when the valve is opened.

My invention still further relates to a line check valve of this character in which a seatless valve assembly is employed whereby a more durable construction is produced, and whereby leakage is completely prevented.

Figure 1:
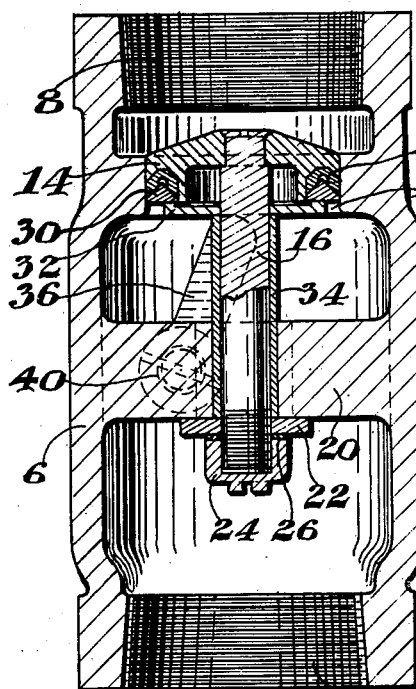
Fig. 1 represents a longitudinal section of a line check valve embodying my invention.
Figure 2:
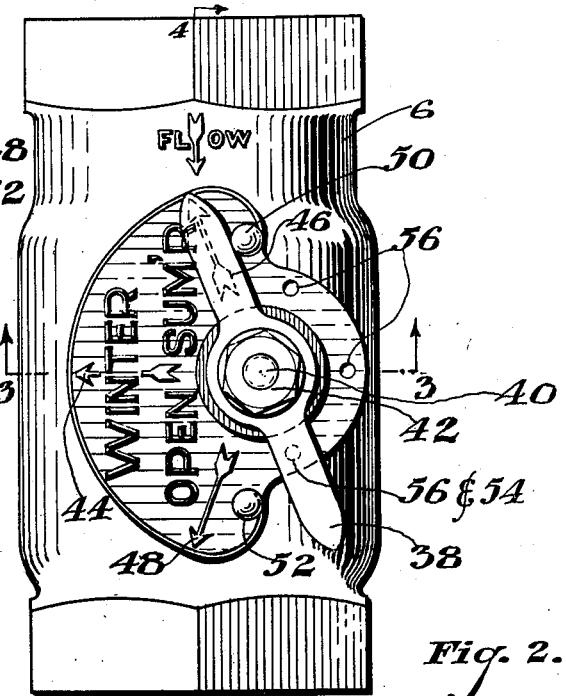
Fig. 2 represents a side elevation of Fig. 1.

Referring to the drawing in which like reference characters indicate like parts 6 designates a valve body which is adapted to be connected at one end 8 thereof to the pump end of a line and which is also adapted to be connected at the other end thereof to the delivery or circulating end of the line. Within the valve body 6 is provided the valve throat 12 which is adapted to be closed by the valve piston head 14. The valve piston head 14 is carried by the stem 16 which passes through an aperture 18 in the bridge member 20. To the other end of the stem 16 is secured a stop collar 22 suitably retained by the nut 24 and the lock washer 26. The valve piston head 14 and the stem 16 are freely movable as a unit within the throat 12 and opening 18. The valve piston head 14 which effects a liquid-tight closure when in the position shown in Fig. 1, is provided with the chevron type annular packing 28 which is confined between a corresponding seat in the valve piston head 14 and the triangularly shaped annulus 30. The annulus 30 is retained by the plate 32 which is mounted on the valve stem 16 and which is adapted to be clamped in position by the sleeve 34 which in turn is tightened by turning the nut 24 on the threaded portion of the stem 16.

Figure 3:
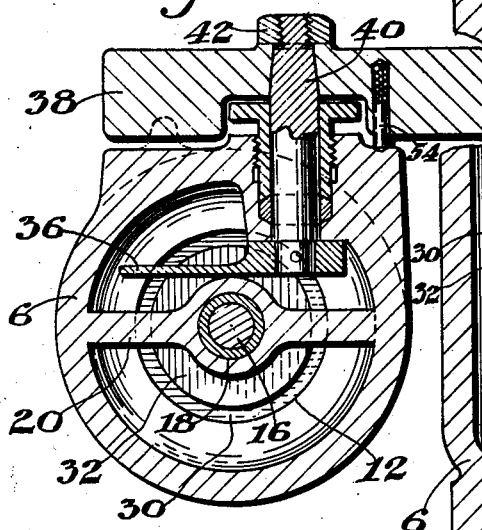
Fig. 3 represents a section on line 3—3 of Fig. 2.
Figure 4:
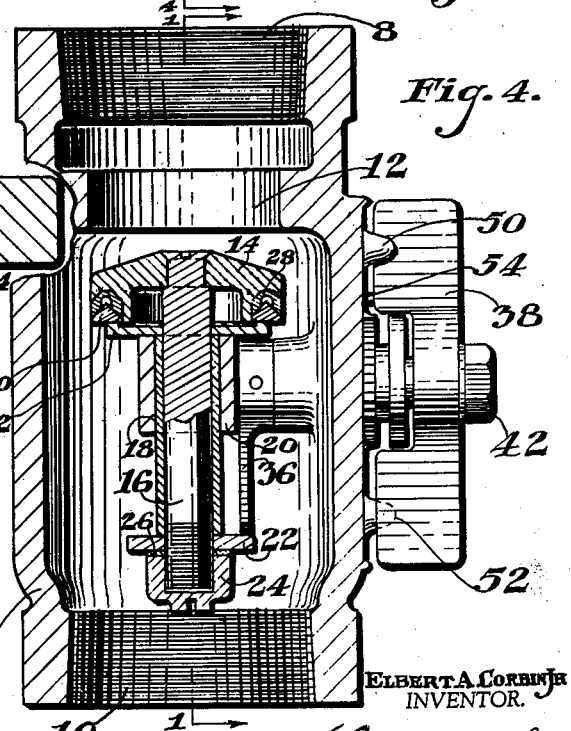
Fig. 4 represents a section on line 4—4 of Fig. 2.

Assuming the construction so far described to be assembled as suggested in connection with a pump, it will be seen that the pressure created by the pump will displace the valve piston head 14 from the position shown in Fig. 1 in which it closes the throat 12 into the position shown in Fig. 4 in which the throat 12 is completely opened. If the pump is of the reciprocating type, the valve piston head 14 and the stem 16 reciprocate concomitantly with the pump and if the pump be of the circular type, which produces a constant stream or pressure, the piston head 14 and stem 16 are maintained in the open position shown in Fig. 4 as long as the pump is in operation. In order to lock the valve assembly in the open position shown in Fig. 4, or in the closed position shown in Fig. 1, I have provided the latch 36 which is adapted to be actuated by the handle 38, said latch and handle being mounted on the common stem 40 and locked in position by the nut 42. When it is desired to allow the valve assembly to reciprocate with the pump, the handle 38 is disposed so as to point towards the arrow 44, in which position, the latch 36 is in the position shown in Fig. 3 which is its neutral or inoperative position. If it is desired to maintain the valve assembly in the closed position as shown in Fig. 1 against the impulse of the pump, the handle 38 is disposed so as to point to the arrow 46, in which position, the latch 36 abuts against the plate 32 and prevents movement of the valve piston head 14 and its stem 16. If it is desired to lock the valve assembly in the open position as shown in Fig. 4, the handle 38 is turned around until it registers with the arrow 48 whereupon the latch 36 abuts against the stop collar 22 as shown. In order to facilitate operation of the handle 38 I have provided the stops 50 and 52 which limit the movement of the handle in opposite directions, and I have also provided the handle with the spring-pressed pin 54 which is adapted to engage one or the other of the three notches 56 which correspond with the position of the arrows 44, 46 and 48 respectively, thus tending to lock the handle in the desired position against accidental displacement. The stem 40 carrying the latch 36 and handle 38 is suitably packed against leakage.

While my novel construction has a wide range of application wherever a line check is necessary, I have found it to be especially advantageous for use in connection with domestic and industrial hot water heating systems.

It will be seen from my construction, as distinguished, for instance, from the conventional, hinged flap check heretofore used, that when the valve piston head 14 is moved away from the throat 12 there is no diminution in the rate of flow since the space surrounding the valve piston assembly, as best seen from Fig. 4, is ample to take care of all requirements which is not possible in the flap check valve which acts as a baffle or deflector in the path of the flow. Furthermore, flap check valves heretofore used have almost all universally leaked back against the pump due to the difficulty in accurately seating such flap check valves or in maintaining tight contact between the valve and the seat, whereas, in my construction I utilize a seatless valve assembly which insures a completely liquid-tight connection at a relatively low initial and no maintenance expense.

Having thus described my invention, what I claim as new and desire to secure by Letters Patent is:

A line check valve comprising, a hollow valve body adapted to be interposed intermediate a pump and a line through which the pump circulates a liquid, a seatless valve throat formed in said body at the discharge end thereof, a seatless freely reciprocable valve piston adapted to enter and close said valve throat, an apertured bridge member formed within said body, a stem carrying said valve piston and guided in the aperture of said bridge member, said valve piston being adapted to be displaced from its closing position by liquid pressure within the valve and to be actuated into its closing position, by back pressure of the liquid in said body, and means for locking said valve piston in its closed or open position irrespective of said liquid pressure, comprising a latch disposed within said valve body and movable for engagement with said valve piston or the end of said stem, a handle exterior of said valve body for actuating said latch, means associated with said handle for indicating the position of said latch, and means for retaining said handle in any desired position against accidental movement thereof comprising a spring-pressed pin carried by said handle and adapted selectively to engage spaced notches formed in the juxtaposed face of said valve body.

ELBERT A. CORBIN, Jr.